Patented Oct. 25, 1949

2,485,916

UNITED STATES PATENT OFFICE 2,485,916

SOLVENT EXTRACTION OF COTTONSEED OIL

Alicia Perez, Bartlesville, Okla., assignor to Phillips Petroleum Company, a corporation of Delaware No Drawing. Application August 30, 1948, Serial No. 46,927

16 Claims. (Cl. 260—412.4)

This invention relates to the treatment of vegetable material. In one of its more specific aspects it relates to a method of removing colored material and other impurities from vegetable materials. In another of its more specific aspects it relates to a method of extracting a vegetable oil of improved quality in improved quantity. In another of its more specific aspects it relates to a method of producing an improved vegetable residue material.

Until recently the extraction of oil from vegetable materials, such as cottonseed, soybean and tung nuts was accomplished by grinding or flaking the vegetable material and extracting the oil by expression. This method of extraction proved to be generally unsatisfactory because of the low yield of oil resulting from the large proportion of vegetable oil remaining in the residue vegetable or "cake." A further disadvantage of that process was that all of the oil soluble impurities remained in the oil product, thus resulting in a product which was dark in color and unattractive in appearance, odor and taste. The oil which was produced in that manner was necessarily subjected to expensive refining operations prior to its utilization as a food or a drying oil. The process utilized entailed not only expensive labor costs but also expensive special reagents and often resulted in a substantially decreased volume of desirable product.

Conventional solvent extraction methods of vegetable oil extraction have generally replaced the expression extraction processes. When the vegetable material is contacted with a hydrocarbon solvent having a carbon content falling within the $C_4$ to $C_8$ range, improved yields of oil are obtained. Even with that improved method of extraction, however, considerable difficulty is encountered by reason of the fact that a large proportion of the color bodies and other impurities are removed from the vegetable material along with the oil by the solvent. The refining step is therefore equally as necessary in the conventional solvent extraction method as in the expression extraction method.

An object of this invention is to provide an improved method of extracting color materials from vegetable materials. Another object of the invention is to provide an improved method of solvent extraction of vegetable oil of improved quality. Another object is to provide a method of removing high quality vegetable oil from vegetable materials. Another object is to provide a method for improving the color of vegetable oils. Another object is to provide a method for improving the volume recovery of vegetable oil. Other and further objects and advantages will be apparent upon study of the accompanying discussion.

Color bodies and other impurities may be removed from vegetable materials before extracting the vegetable oil therefrom. In that manner the resulting vegetable oil and the vegetable cake residue is produced in a quality which heretofore has required much expensive refining. The refining step which is conventionally used may, if desired, be avoided entirely in the utilization of my process. If it is desired to utilize the refining step, however, a considerable saving is accomplished by reason of the very small loss of caustic and the small amount of loss of product because of the reduced amount of impurities in the oil before the refining step.

I have found that a solvent comprising an alcohol, or mixture of alcohols, and a small proportion of a soap will advantageously remove color bodies and other detrimental impurities from the vegetable material being treated so that subsequent extraction with suitable hydrocarbon solvents will produce a high yield of oil of a purity comparable to that formerly obtained from expensive refining procedures. Use of an alcohol as a solvent without the small proportion of soap results in a considerable loss of oil product by reason of the fact that the alcohol is a relatively good solvent for the oil and considerable oil is removed from the vegetable material along with the color bodies and other impurities. The addition of soap to the alcohol solvent greatly suppresses the solubility of the oil and at the same time promotes the solubility of the vegetable impurities, especially the color bodies. The advantage of this type of solvent is therefore twofold. The ultimate yield of oil from the seed is increased and the final oil product is of higher quality.

Vegetable materials which are especially adapted to treatment by the pre-extraction step are cottonseeds, soybeans and tung nuts. The vegetable material is generally hulled and delinted in preparation for the extraction of the vegetable oil. It has then generally proved to be advantageous to flake or grate the vegetable material so as to provide a greater surface area for contact with the solvents to be used. The vegetable flakes or meal may be either cooked or uncooked before the solvent steps. In either instance, the solvent extraction steps may be carried on batchwise or, as is preferred, in a continuous countercurrent contact.

In a preferred method of vegetable material treatment a flaked vegetable material, such as cottonseed, soybean or tung nuts, is passed downwardly through a contacting column countercurrent to the flow of a solvent material comprising a monohydric alcohol, such as methanol, ethanol, propanol or isopropanol, in an amount of an alkali metal salt of a fatty acid ranging between 0.3 per cent by weight and a weight which will cause the alcohol to lose its fluidity. Alcohols having not more than three carbon atoms per molecule are ordinarily used. Alcohols having a greater carbon content may be used in some instances. Methanol is ordinarily preferred as the alcohol solvent. The upper limit of the soap content will generally not range above 10 per cent by weight. It is preferred, however, to limit the amount of alkali metal salt of a fatty acid in the alcohol to an amount ranging between 1.5 per cent by weight and 3.5 per cent by weight. The contact mixture is maintained in liquid phase at a temperature between about 40° C. and the boiling point of the solvent for a period of between about 10 and about 120 minutes and preferably between about 45 and 60 minutes. After the desired contact has been accomplished between the alcohol-soap solvent and the vegetable material, the solvent and materials dissolved therein are separated from the vegetable material. The vegetable material is then preferably dried so as to remove the solvent materials therefrom. The dried vegetable material is then contacted with a hydrocarbon solvent having a carbon content within the range of $C_4$ to $C_8$, such as normal pentane, in a manner similar to the purification step above described. It is preferred to utilize a hydrocarbon solvent falling within the $C_5$–$C_8$ range because of the high pressure equipment required to maintain the lower carbon content solvents in liquid phase. The contact mixture in the oil extraction step is maintained at a temperature between about 10° C. and 100° C. but preferably between 30° C. and 60° C. for a period of between about 5 and about 180 minutes while maintaining the mixture under a pressure sufficiently great to substantially maintain the solvent in the liquid phase. The oil extraction step is preferably completed in between 30 and 90 minutes. Upon completion of the contact period, the vegetable material is separated from the resulting miscella and is dried so as to remove the final traces of solvent material. In some cases the solvent-free vegetable material is conditioned by toasting after which it is cooled, sifted, and packaged. The resulting miscella is filtered, preheated to almost the boiling point of the solvent, and then sent to an evaporator where most of the solvent vapors pass overhead to a condenser. The small amount of solvent that remains in the oil may be removed by stripping, as in a vacuum stripping column. The resulting oil is bland in odor, light in color and is substantially equivalent to or superior to the vegetable oils resulting from conventional refining steps. After washing, deodorizing, and bleaching, the oil product is ready for any one of the numerous commercial uses found for such vegetable oils, such as foods, drying oils, etc. The residue of vegetable material is free of many of its impurities, especially the toxic impurities which have heretofore been present and is eminently suitable as a cattle food. If the vegetable material has not been cooked prior to the extraction steps, it is preferably cooked before being used as a cattle feed. In both the purification and oil extraction steps it is preferred to maintain the ratio of solvent to vegetable material within the weight ratio range of from 4:5 to 4:1. The vegetable meal may be contacted with about an equal volume of warm water, separated from the water and pressed dry so as to remove any slight traces of soap which may have remained in the meal.

The alkali metal salts which are generally preferred in the preparation of a soap for use in the purification solvent are sodium and potassium salts. The soap may be a sodium or potassium salt of any of the well known detergent fatty acids or mixtures thereof, such as oleic, palmitic, etc. Synthetic detergents, such as polyethylene oxide emulsifiers or mixtures of soaps, synthetic detergents, etc., may be utilized. Any of the well known methods of recovery and reuse may be applied to the alcohol and hydrocarbon solvent steps.

The term "miscella" as used throughout this disclosure and the claims is used to denote the solvent-oil mixture stage in the solvent extraction of the vegetable oil.

This invention has proved to be particularly beneficial in the extraction of cottonseed oil. The cottonseeds contain toxic gossypol, a highly colored material which may either be destroyed by heat or other means, or must be removed from both the meal and the oil. Heating the meal to such an extent that the toxic property of the gossypol is destroyed, coagulates and darkens the protein and also destroys some of the food value of the meal. This invention is particularly beneficial in that the gossypol is removed from the cottonseeds before the oil extraction step and in that manner saves a considerable loss in the oil product by reason of refining loss. More complete understanding of the invention will be obtained upon examination of the following specific examples.

EXAMPLE I

Commercial dehulled West Texas cottonseed was ground in a Waring Blendor to pass through a 20-mesh screen. A 250 gram sample of the cottonseed prepared as above described was divided in five 50 gram batches. Each 50 gram batch was placed in a column type extractor 1.5 inches in diameter and 8 inches in length. An electrical resistance wire was placed around the tube so as to maintain the solvent at the desired temperature during the extraction process. Four hundred ml. of dried methanol containing 2.5% by weight of "Ivory" soap flakes (a sodium soap of a tallow acid) were allowed to percolate through the glass column containing the first batch of seed, at approximately the boiling point of the methanol. The solvent was allowed to percolate through the meal under gravity or slight positive pressure. This required approximately one hour. The first 50 ml. portion of methanol percolating through the first batch of meal was separated. The remainder of the solvent was made up to 400 ml. with fresh solvent-soap mixture and circulated through the next batch of seed. This process was repeated with the third to fifth batches of seed at the temperature mentioned before. Results obtained in this process were considered indicative of a continuous countercurrent extraction operation. The cottonseed meal was dried at 60° C. for two hours, after which a hydrocarbon solvent extraction of each individual batch was effected in a Soxhlet extractor with normal pentane over an 8-hour period. The solvent was removed individually from each of the resulting miscellas by distillation under vacuum. Disregarding the first sample an average of 13.5 grams of refined oil was obtained from 50 grams of seed. A similar sample of cottonseed was treated similarly with the exception that the alcohol purification step was omitted. A yield of 15.3 grams of crude oil was obtained. It will therefore be noted that the yield of high quality refined oil resulting from the process including the alcohol purification step was approximately 88 per cent of the crude oil yield.

EXAMPLE II

The process above described including the alcohol purification step was repeated but the soap was omitted from the alcohol solvent. A corresponding yield of 11.5 grams of refined oil was recovered as a result of this process. The yield of oil obtained therefrom was therefore approximately 75 per cent of the crude oil yield.

EXAMPLE III

Another similar sample of the above mentioned cottonseed was extracted by the conventional solvent extraction method which omitted the alcohol-soap purification step and utilized commercial normal hexane as the extraction solvent. The crude oil obtained therefrom was refined with 18° Be sodium hydroxide by a modified standard refining method (AOCS Official Method Ca 9a—41—Refining Loss). The yield of refined oil was 84 per cent of the above crude oil yield.

The first example was repeated using varying amounts of soap in the alcohol solvent purification step. Comparison of the examples utilizing methanol without the soap and methanol with soap of three varying concentrations are set forth below in Table I.

TABLE I

*Application of two-stage process to multiple batches of cottonseed*

| Pretreatment Solvent | Oil Yields in Grams per 50 Grams of Seed [1] | | | | | Average [2] | | |
|---|---|---|---|---|---|---|---|---|
| | 1 | 2 | 3 | 4 | 5 | Weight Per Cent of Extractable Oil Recovered | Weight Per Cent Oil Loss | Gardner Color |
| Methanol | 10.8 | 11.4 | 12.1 | 12.0 | 12.1 | 75.4 | 24.6 | 8 |
| Methanol+1.3% soap | 11.2 | 13.0 | 13.0 | 13.2 | 13.2 | 85.4 | 14.6 | 7 |
| Methanol+2.5% soap | 11.1 | 13.4 | 13.4 | 13.5 | 13.5 | 88.9 | 11.1 | 7 |
| Methanol+5.0% soap | 9.8 | 13.1 | 13.2 | 13.8 | 13.7 | 86.7 | 13.3 | 7 |

[1] These yields were obtained from hydrocarbon extraction after recirculation of methanol through successive batches of seed.
[2] The average values were taken from the last four samples of each series.

Two characteristic facts are apparent from comparison of the above examples and of the results set forth in Table I. When the methanol-soap composition was used a general improvement and uniformity in color of the oil samples was obtained and a considerable increase in the oil yield was also apparent. Oil samples from the process employing the methanol-soap purification step were stable at room temperature and remained clear. In general, the oils obtained by the process employing a methanol-soap purification step had a low free fatty acid content. The average color and bleaching characteristics of the oil product are in the same range as those of conventional alkali-refined oils. The seed sample pre-extracted with methanol containing about 2.5 per cent by weight of soap produced an oil, the specifications of which fall generally within the AOCS recommended specifications for refined cottonseed oil as set forth in Table II below.

TABLE II

*AOSC specification tests on experimental oil sample*

| | AOCS Specification Limits | Experimental Oil Sample |
|---|---|---|
| Specific gravity at 25/25 C | 0.916 to 0.918 | 0.917 |
| Refractive Index at 25 C | 1.468 to 1.472 | 1.469 |
| Iodine value | 106 to 113 | [1] 100.4 |
| Saponification value | 190 to 198 | 190.5 |
| Unsaponifiable matter (per cent) | Not over 1.5 | 1.4 |
| Free fatty acid (as oleic, per cent) | Not over 0.25 | 0.22 |
| Clarity | Clear at 70 F. for at least 2 hours. | pass |

[1] West Texas cottonseed oils may have an iodine value as low as 99. They are consistently less unsaturated.

The specific solvents, soap and vegeable material set forth in the specific examples above are not to be construed as limiting the invention as the broader scope of such materials has been set forth within the body of the above disclosure. As will be evident to those skilled in the art, various modifications of this invention can be made or followed in the light of the foregoing disclosure and discussion without departing from the spirit or scope of the disclosure.

I claim:

1. An improved method of processing a vegetable material which comprises the steps of contacting said vegetable material with a solvent comprising a monohydric alcohol having up to three carbon atoms per molecule, and between 0.3 per cent by weight and a weight of an alkali metal soap which causes said alcohol solution to lose its fluidity; heating said contact mixture at a temperature between about 40° C. and the boiling point of said solvent for a period of at least 10 minutes; separating said solvent and dissolved material from said vegetable material; and removing vegetable oil from said vegetable material.

2. An improved method of processing a vegetable material which comprises the steps of contacting said vegetable material with a solvent comprising a monohydric alcohol having up to three carbon atoms per molecule, and between 0.3 per cent by weight and a weight of an alkali metal soap which causes said alcohol solution to lose its fluidity; heating said contact mixture at a temperature between about 40° C. and the boiling point of said solvent for a period of at least 10 minutes; separating said solvent and dissolved material from said vegetable material; contacting said vegetable material with a hydrocarbon solvent having a carbon content within the C4–C8 range; heating said mixture for a period of at least 5 minutes at a temperature between about 10° C. and about 100° C. while maintaining said solvent in the liquid phase; separating a miscella comprising said solvent and an oil of said vegetable material from said vegetable; and separating said solvent and said oil.

3. An improved method of processing a vegetable material which comprises the steps of contacting said vegetable material with a solvent comprising a monohydric alcohol having up to three carbon atoms per molecule, and between 0.3 per cent by weight and 10 per cent by weight of an alkali metal soap; heating said contact mixture at a temperature between about 40° C. and the boiling point of said solvent for a period of between 10 and 120 minutes; separating said solvent and dissolved material from said vegetable material; drying said vegetable material; contacting said vegetable material with a hydrocarbon solvent having a carbon content within the C4–C8 range; heating said mixture for a period of between 5 and 180 minutes at a temperature between about 10° C. and about 100° C. while maintaining said solvent in the liquid phase; separating a miscella comprising said solvent and an oil of said vegetable material from said vegetable; and separating said solvent and said oil.

4. An improved method of processing a vegetable material which comprises the steps of contacting said vegetable material with a solvent comprising a monohydric alcohol having up to three carbon atoms per molecule, and between 1.5 per cent by weight and 3.5 per cent by weight of an alkali metal salt of a fatty acid; heating said contact mixture at a temperature between about 40° C. and the boiling point of said solvent for a period of between 45 and 60 minutes; separating said solvent and dissolved material from said vegetable material; drying said vegetable material; contacting said vegetable material with a hydrocarbon solvent having a carbon content within the C4–C8 range; heating said mixture for a period of between 30 and 90 minutes at a temperature between about 10° C. and about 100° C. while maintaining said solvent in the liquid phase; separating a miscella comprising said solvent and an oil of said vegetable material from said vegetable; and stripping said solvent from said oil.

5. The method of claim 4, wherein said alcohol is methanol.

6. The method of claim 4, wherein said alcohol is ethanol.

7. The method of claim 4, wherein said alcohol is isopropanol.

8. The method of claim 4, wherein said alkali metal salt is a sodium salt.

9. The method of claim 4, wherein said alkali metal salt is a potassium salt.

10. The method of claim 4, wherein said vegetable material is cottonseed.

11. The method of claim 4, wherein said vegetable material is soybean.

12. The method of claim 4, wherein said vegetable material is tung nut.

13. A method of processing cottonseeds which comprises the steps of flaking de-linted and hulled cottonseeds; contacting said cottonseeds with a solvent comprising methanol and between 1.5 per cent by weight and 3.5 per cent by weight of a sodium salt of a fatty acid; heating said contact mixture at a temperature between about 40° C. and the boiling point of said solvent for a period of between 45 and 60 minutes; separating said solvent and dissolved material from said cottonseed; drying said cottonseeds; contacting said cottonseed with normal pentane; heating said mixture for a period of between 30 and 90 minutes at a temperature between about 10° C. and about 100° C. while maintaining said normal pentane in the liquid phase; separating a miscella comprising said normal pentane and cottonseed oil from residue cottonseed; and stripping said normal pentane from said cottonseed oil.

14. The method of claim 13, wherein said cottonseeds are cooked before contacting with said methanol-soap solvent.

15. A method of removing color materials from vegetable material which comprises the steps of flaking said vegetable material; contacting said vegetable material with a solvent comprising a monohydric alcohol having up to three carbon atoms per molecule, and between 1.5 per cent by weight and 3.5 per cent by weight of an alkali-metal salt of a fatty acid; heating said contact mixture at a temperature between about 40° C. and the boiling point of said solvent for a period of between 45 and 60 minutes; and separating said solvent and dissolved color material from said vegetable material.

16. The method of claim 13, wherein said cottonseed oil is contacted with a strong alkali, whereby said oil is refined and excess fatty acid is neutralized; and recovering said refined oil.

ALICIA PEREZ.

REFERENCES CITED

The following references are of record in the file of this patent:

UNITED STATES PATENTS

| Number | Name | Date |
|---|---|---|
| 1,653,201 | Bollmann | Dec. 20, 1927 |